United States Patent
Zhu et al.

(10) Patent No.: US 12,437,193 B2
(45) Date of Patent: Oct. 7, 2025

(54) MULTI-RELATIONAL GRAPH CONVOLUTIONAL NETWORK (GCN) IN RISK PREDICTION

(71) Applicants: International Business Machines Corporation, Armonk, NY (US); Rensselaer Polytechnic Institute, Troy, NY (US)

(72) Inventors: Yada Zhu, Irvington, NY (US); Sijia Liu, Somerville, MA (US); Aparna Gupta, Latham, NY (US); Sai Radhakrishna Manikant Sarma Palepu, Troy, NY (US); Koushik Kar, Waterford, NY (US); Lucian Popa, San Jose, CA (US); Kumar Bhaskaran, Englewood Cliffs, NJ (US); Nitin Gaur, Round Rock, TX (US)

(73) Assignees: International Business Machines Corporation, Armonk, NY (US); Rensselaer Polytechnic Institute, Troy, NY (US)

( * ) Notice: Subject to any disclaimer, the term of this patent is extended or adjusted under 35 U.S.C. 154(b) by 1199 days.

(21) Appl. No.: 17/241,790

(22) Filed: Apr. 27, 2021

(65) Prior Publication Data

US 2022/0366231 A1    Nov. 17, 2022

(51) Int. Cl.
*G06N 3/08*     (2023.01)
*G06N 3/045*    (2023.01)

(52) U.S. Cl.
CPC .............. *G06N 3/08* (2013.01); *G06N 3/045* (2023.01)

(58) Field of Classification Search
CPC .......... G06N 3/08; G06N 3/045; G06N 3/082; G06N 3/042; G06N 3/0495; G06N 3/0895;

(Continued)

(56) References Cited

U.S. PATENT DOCUMENTS 7,555,257 B2    6/2009  Grossman et al.
8,990,884 B2    3/2015  Hoyos et al.
(Continued)

FOREIGN PATENT DOCUMENTS

CN    106384166 A    2/2017
CN    107506916 A    12/2017
(Continued)

OTHER PUBLICATIONS

Zhang et al.—"Multiplex Graph Neural Networks for Multibehavior Recommendation" (Year: 2020).*

(Continued)

*Primary Examiner* — Reji Kartholy
(74) *Attorney, Agent, or Firm* — Scully, Scott, Murphy & Presser, P.C.; Jared Chaney

(57) ABSTRACT

A graph neural network can be built and trained to predict a risk of an entity. A multi-relational graph network can include a first graph network and a second graph network. The first graph network can include a first set of nodes and a first set of edges connecting some of the nodes in the first set. The second graph network can include a second set of nodes and a second set of edges connecting some of the nodes in the second set. The first set of nodes and the second set of nodes can represent entities, the first set of edges can represent a first relationship between the entities and the second set of edges can represent a second relationship between the entities. A graph convolutional network (GCN) can be structured to incorporate the multi-relational graph network, and trained to predict a risk associated with a given entity.

18 Claims, 10 Drawing Sheets

(58) Field of Classification Search
CPC ............ G06N 3/0464; G06Q 10/0635; G06Q 30/0201; G06Q 40/03; G06Q 40/08
See application file for complete search history.

(56) References Cited

U.S. PATENT DOCUMENTS

| | | | |
|---|---|---|---|
| 2017/0357920 A1* | 12/2017 | Stewart | G01W 1/10 |
| 2018/0330435 A1* | 11/2018 | Garg | G06Q 40/03 |
| 2019/0378051 A1* | 12/2019 | Widmann | G06N 20/00 |
| 2020/0202428 A1* | 6/2020 | Song | G06F 18/214 |
| 2021/0256378 A1* | 8/2021 | Watt | G06N 3/044 |

FOREIGN PATENT DOCUMENTS

| | | |
|---|---|---|
| CN | 108647828 A | 10/2018 |
| CN | 111401600 A | 7/2020 |
| CN | 112328839 A | 2/2021 |
| CN | 112446778 A | 3/2021 |
| CN | 112465641 A1 | 3/2021 |
| KR | 102104316 B1 | 10/2019 |
| KR | 102146546 B1 | 5/2020 |

OTHER PUBLICATIONS

Liu et al.—"Revisiting Edge Perturbation for Graph Neural Network in Graph Data Augmentation and Attack" (Year: 2015).*

Lee et al.—"Graph Convolutional Network-based Credit Default Prediction utilizing three types of virtual distances among borrowers" (Year: 2020).*

Yan, C., et al., "Neural Network Based Relation Extraction of Enterprises in Credit Risk Management", 2019 IEEE International Conference on Big Data and Smart Computing (BigComp), Feb. 2019, 6 pages.

Nikolaou, I., et al., "A system dynamic approach for exploring the effects of climate change risks on firms' economic", Journal Of Cleaner Production, Sep. 25, 2015, 8 pages, vol. 103.

Paisley, J., et al., "Climate Risk Management at Financial Firms A Good Start, But More Work to Do", Results from a Global Survey, GARP Risk Institute, 2019, https://www.garp.org/newmedia/gri/climate-risk-management-survey/AGoodStart_052919_PDF.pdf, Accessed on Apr. 22, 2021, 14 pages.

Bardoscia, M., et al., arXiv: 1602.05883v1, Feb. 18, 2016, https://www.researchgate.net/publication/301847185_Pathways_towards_instability_in_financial_networks/fulltext/5734a08908ae9ace8409174a/Pathways-towards-instability-in-financial-networks.pdf?origin=publication_detail, Accessed on Apr. 22, 2021, 13 pages.

Lee, H., et al., "Does Implementation of Big Data Analytics Improve Firms' Market Value? Investors' Reaction in Stock Market", Sustainability 2017, Apr. 9, 2017, Accepted Jun. 3, 2017, Published Jun. 9, 2017, 17 pp. 9, 978.

NIST, "NIST Cloud Computing Program", http://csrc.nist.gov/groups/SNS/cloud-computing/index.html, Created Dec. 1, 2016, Updated Oct. 6, 2017, 9 pages.

* cited by examiner

MULTI-RELATIONAL GRAPH CONVOLUTIONAL NETWORK (GCN) IN RISK PREDICTION

BACKGROUND

The present application relates generally to computers and computer applications, and more particularly to machine learning and multi-relational graph convolutional network (GCN), and GCN in credit risk and climate risk prediction.

A GCN can capture data in the form of a graph or graph network and perform machine learning on such data, incorporating the relationships among the nodes of the graph.

BRIEF SUMMARY

The summary of the disclosure is given to aid understanding of a computer system and method of providing multi-relational GCN, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system and/or their method of operation to achieve different effects.

A computer-implemented method and system of building a graph neural network to predict a risk on entities, can be provided. The method, in an aspect, can include creating a multi-relational graph network including at least a first graph network including a first set of nodes and a first set of edges connecting at least some of the nodes in the first set, a second graph network including a second set of nodes and a second set of edges connecting at least some of the nodes in the second set, the first set of nodes and the second set of nodes representing entities, the first set of edges representing a first relationship between the entities and the second set of edges representing a second relationship between the entities. The method can also include structuring a graph convolutional network (GCN) that incorporates the multi-relational graph network. The method can further include training the GCN to predict a risk associated with a given entity.

A system for building a graph neural network to predict a risk on entities, in an aspect, can include a processor and a memory device coupled with the processor. The processor can be configured to create a multi-relational graph network including at least a first graph network including a first set of nodes and a first set of edges connecting at least some of the nodes in the first set, a second graph network including a second set of nodes and a second set of edges connecting at least some of the nodes in the second set, the first set of nodes and the second set of nodes representing entities, the first set of edges representing a first relationship between the entities and the second set of edges representing a second relationship between the entities. The processor can also be configured to structure a graph convolutional network (GCN) that incorporates the multi-relational graph network. The processor can also be configured to train the GCN to predict a risk associated with a given entity.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
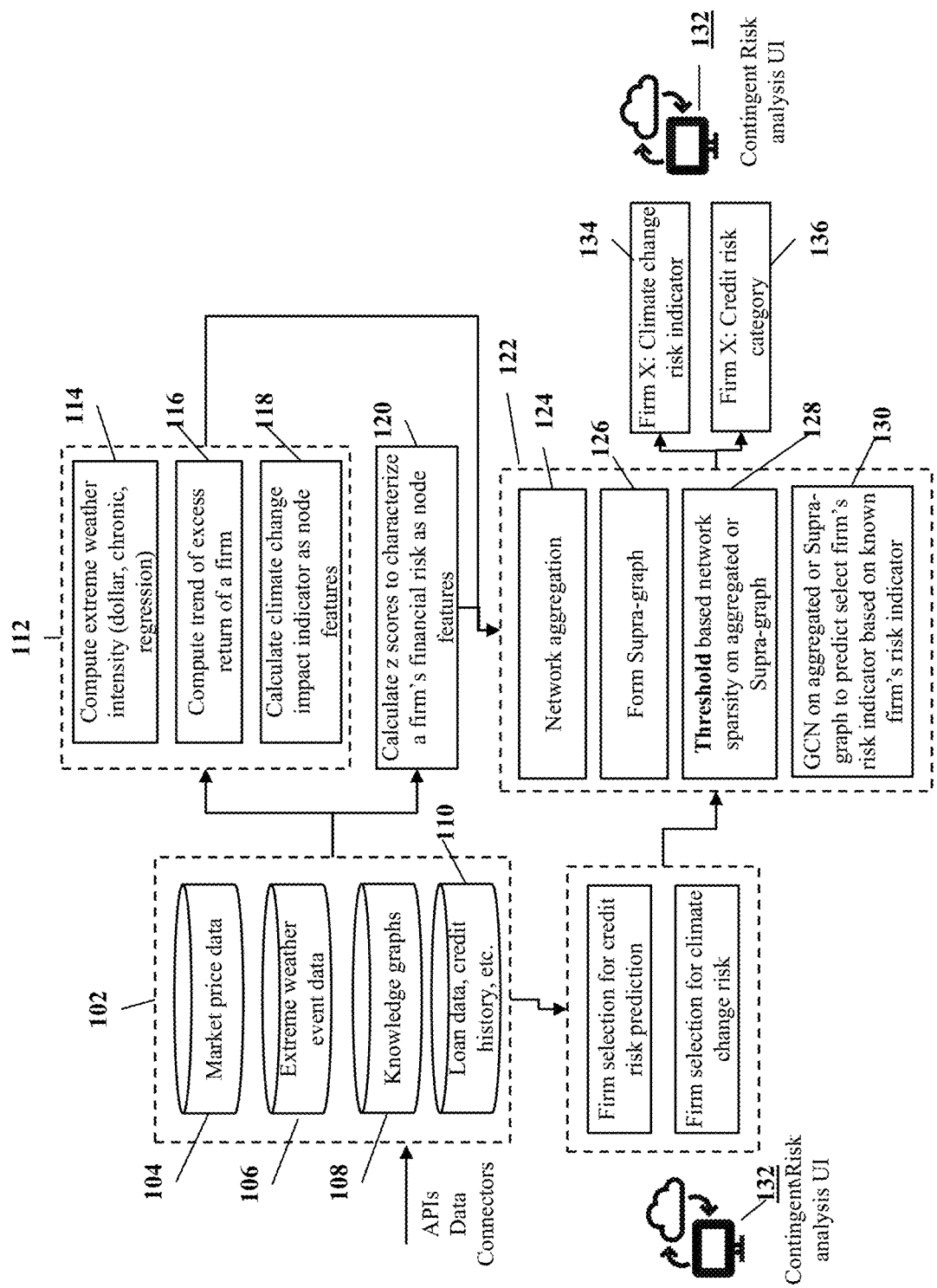
FIG. 1 is diagram illustrating an MR-GCN method for predicting risk in financial domain in an embodiment.

Systems, methods can be provided that improve graph convolutional networks ((GCNs) and various applications training and utilizing GCNs for predictions. For example, improvements in GCNs can be provided, which can learn about firms and classify them on their climate risk and credit risk by extracting information from their network connections along with their fundamentals. In an embodiment, a system, for example, can tackle this problem by creating multi-relational financial network (MRFN) benchmark datasets and bringing about variations of GCNs tailored to predict the risk of firms. In an embodiment, such GCNs can predict the risk of firms in a semi-supervised fashion. The system, in an embodiment, can build the MRFN datasets, which are reflective of the financial wisdom of investors and the market sentiment of the investors. In an embodiment, the MRFN datasets can be defined through multi-layered networks, for example, two-layered networks along with per-node financial features and risk labels. In an embodiment, the system can introduce formulations of multi-relational GCN (MR-GCN): GCN via network aggregation and GCN via supra-graph. Experiment results show that MR-GCN models outperform the conventional uni-relational GCN (UR-GCN) models in terms of achieving an improvement in classification accuracy, for example, for the climate risk prediction and credit risk prediction. In an embodiment, the system can also incorporate a network sparsity technique, which can improve the risk prediction accuracy. The system can a supplement to the field of machine learning, for example, but not limited to, for finance.

In one or more embodiments, a system and/or method can be provided which implements a GCN method, which can embed heterogenous intra-layer and inter-layer relationships, model the contingent effects from firm's (e.g., node's) relationship with other firms (nodes) who are also exposed to that risk, infusing sparsity into network layers to reduce impact of noisy relationships, utilize a climate change impact indicator. The system and/or method, by implementing such a GCN can provide a risk analytics system with credit risk ranking and climate change risk ranking.

Artificial intelligence (AI) and machine learning (ML) algorithms can provide understanding and discovery of new patterns from data with insights. For example, in the field of quantitative finance, AI can be used in various aspects of finance and corporate default predictions. The system, in an embodiment, can bridge the gap between the world of graph neural networks and finance by incorporating pivotal problems in the domain of finance. For example, the system in an embodiment considers predicting and classifying the climate change risk and credit risk of firms using graph-based learning, for instance, applying graph-based learning in assessing climate change and credit risks. The system, in an embodiment, leverages the power of incorporating heterogeneous relationships within the same network layers and between two different layers to increase the classification accuracy. The system also can include or perform the process of developing a graph in the financial domain which can be easily replicated.

By way of example, long-term health of organizations can be evaluated by analyzing various financial risks. Two such risks are the climate risk and credit risk. The climate risk is a very contemporary problem in financial domain to assess and quantify the acute climate change risk impact on firms and their financials. The system, in an embodiment, considers the climate risk from a financial point of view and examines how it influences firms and their viability. The credit risk can be considered another pivotal financial problem to predict the creditworthiness class of the firms. Using financial ratio analysis, one can predict the creditworthiness of the firms. Financial distress prediction has incorporated sophisticated models to solve for such creditworthiness.

The system, in an embodiment, leverages interactions among the firms. For instance, interactions among firms in a network, for example, in financial networks, can play a role in achieving financial stability. The system, for example, builds for benchmark financial network datasets and implements one or more graph-based ML approaches, for instance, for evaluating the problems of climate risk and credit risk prediction. The system can provide improvements in the machine learning (ML) field and in financial prediction. In an embodiment, the system can quantify the conditional dependence of firms through multiple network layers, each of which represents some form of association between the firms. Based on that, the system implements the multi-relational financial network (MRFN) datasets, which are representative of a real-world network of firms, for example, using investor searches and the idiosyncratic price co-movements of the assets.

The system, in an embodiment, incorporates networks in ML techniques for performing financial predictions. Graph convolutional network (GCN) a type of convolutional neural network (CNN) with architecture for machine learning on graphs. GCN presents a semi-supervised ML approach, which operates on graph data structures. The system, in an embodiment, implements a GCN for incorporating network-structured data for node/graph classification. The system also addresses the problem or difficulty in incorporating multiple network layers, that is, multiple graphs in GCN prediction.

In one or more embodiments, the system synthetically creates MRFN datasets, which can be used for future research in the field of ML for finance. The system implements GCN variants (e.g., via network aggregation and supra-graph representation) to combine multiple network layers and also infuse sparsity into network layers. Experimental results demonstrate improved empirical performance of the implemented GCN, for example, in solving climate risk and credit risk problems in finance over conventional uni-relational GCNs, providing improvement in prediction accuracy.

Financial markets and asset returns are shown to be good indicators of capturing the effect of climate change risk on the financials of firms. Long run temperature fluctuations can have negative effects on U.S equity portfolios. Abnormal effects may occur on stock returns and liquidity in the stock markets due to weather events such as land fall hurricanes. Food stocks and real estate investment trust (REIT) stocks in financial markets can be negatively impacted by climate change risk. The system in various embodiments can retrieve financial networks from the financial markets, which contain information about climate change risk on firms.

Network pattern of trades captures the relationship between the behavior in the market and asset price returns. The system may utilize the network links emerging between the firms from the investors search for retrieving information with respect to the risk embedded in the firms. Existence of linkages not only spreads contagion but also the presence of optimal linkages and networks help reduce the contagion. The system in various embodiments may identify a combination of MRFN layers and the sparsity for the MRFN layers to capture the most amount of information present in the network.

Graph neural networks can deal with network-structured data. The system in one or more embodiments provides variations in MR-GCN, for example, which can be tailored for solving problems in the financial domain. The system can implement different ways of combining the MRFN network layers, which can be used to understand the relative importance of financial network layers. The system can include the process of developing a graph in the financial domain which can be easily replicated. The system can leverage the power of incorporating heterogeneous relationships within the same network layers as well as between two different layers to increase the classification accuracy. The system can also illustrate that sparsity can improve MR-GCNs.

Financial data can appear in terms of graph structures (e.g., co-moving equity prices of public firms). The system in an embodiment can generate graph-structured financial datasets for evaluating climate risk and credit risk problems by leveraging modern machine learning models (e.g., graph neural networks). The following formalizes a multi-relational financial network (MRFN) whose nodes represent firms and edges represent the association between the firms and encode two types of firm-firm relations (namely, two network layers). In the following, the process is described of MRFN layer identification and extraction and how the MRFN layers are quantified. The node features are described for climate risk and credit risk prediction problems, leading to two MRFN datasets, MRFN-credit and MRFN-climate. Table 1 summarize the statistics of the MRFN datasets in an embodiment.

TABLE 1

|  |  | Node/edge/feature/class # | Description | Source |
|---|---|---|---|---|
| MRFN-climate | Nodes | 215 nodes | Firms | Publicly Available Source |
|  | Layer 1 | 2338 edges | number of online searches between nodes |  |
|  | Layer 2 | 6035 edges | correlation of stock returns between nodes |  |
|  | Node feature | 20 features | Statistical interactions |  |
|  | Node label | 3 classes | Low; Medium; High |  |
| MRFN-credit | Nodes | 194 nodes | Firms | Publicly Available Source |
|  | Layer 1 | 1942 edges | number of online searches between nodes |  |
|  | Layer 2 | 4334 edges | correlation of stock returns between nodes |  |
|  | Node feature | 2 features | Financial ratios |  |
|  | Node label | 3 classes | Safe; Grey; Distress |  |

Multi-Relational Graph Structure

The system in an embodiment considers two types of edges leading to a two-layer financial network, for example, for evaluating the two problems of climate risk and credit risk. The proposed edge types are reflective of the financial wisdom of investors as well as the market sentiment of the investors. Both edges complement each other in terms of one being reflective of one another.

MRFN layer 1 is a type of edge (referred to as the first type) that represents the association between firms in terms of number of online searches between the firms. This means each edge represents the number of directional searches by the investors from one firm to another during a specific time period (e.g., given that the firm A was searched first, there have been 59 instances where B corporation was searched immediately within the next couple of seconds). This type of edge appearing in the first MRFN layer is reflective of financial investor's wisdom and preference for the firms. By way of example, firms can include those in the insurance sector and the firms which are most connected to this sector via these searches. For instance, sophisticated financial investors search for firms and their financial reports on various available systems. The information on internet search traffic covering a predefined time period can be retrieved. For instance, the system may retrieve this search pattern of the investors for a sample of firms between the predefined time period, e.g., referred to as a first time period. This is how the system may extract the first layer of MRFN in an embodiment.

MRFN layer 2 is referred to as equity correlation layer. For example, the other type of edge represents the association between the firms in terms of the correlation between the stock returns of two firms. This type of edge appearing in the second MRFN layer is reflective of the co-movement of assets prices in financial markets. Equity stock markets provide a source for extracting financial networks. Stock price returns exhibit correlations amongst themselves, which helps to develop the second layer of the MRFN. The system, in an embodiment, extracts the intelligence from the stock markets by decomposing the equity returns of the sample of firms into market returns and idiosyncratic components using Capital Asset Pricing Model (CAPM). The system then calculates the correlations between the idiosyncratic risk components of the stock returns. This correlation matrix forms the second layer of the MRFN. For example, the system may collect stock returns for the sample of firms from available online source(s) for the corresponding time period (e.g., the first time period used for building the first MRFN layer) for the purpose of forming the second layer of MRFN.

In an aspect, the MRFN layers for the climate risk and the credit risk problem have nearly identical nodes or firms. In an example network, in MRFN-credit, there exist 194 nodes (firms) which are a subset of 215 nodes in MRFN-climate. In an example network, MRFN-climate and MRFN-credit also contain different types of node features and labels; e.g., see summary in Table 1.

Binary/Unweighted and Weighted Edges

In an embodiment, the system may consider two kinds of edges in the network layers—binary/unweighted and weighted. In the unweighted network design, the association between two firms in both layers is represented in a binary fashion and the strength of the association is ignored. This means in layer 1, any number of searches above a cutoff are indicated as is and below the cutoff are indicated as 0. In layer 2, any absolute value of correlation above a certain threshold is reported as 1 and rest all as 0s. This means that the system may end up with two layers representing binary or unweighted association between the nodes or firms.

In the weighted network design, the association between two firms in both layers is represented as it is and the strength of the association is taken into account. This means in layer 1, any number of searches above a certain threshold are indicated as it is, and searches below the threshold are indicated as 0. In layer 2, any absolute value of correlation above the certain threshold is reported as it is and below the threshold as 0s. This means the system may end up with two layers representing weighted association between the nodes or firms.

Figure 2B:
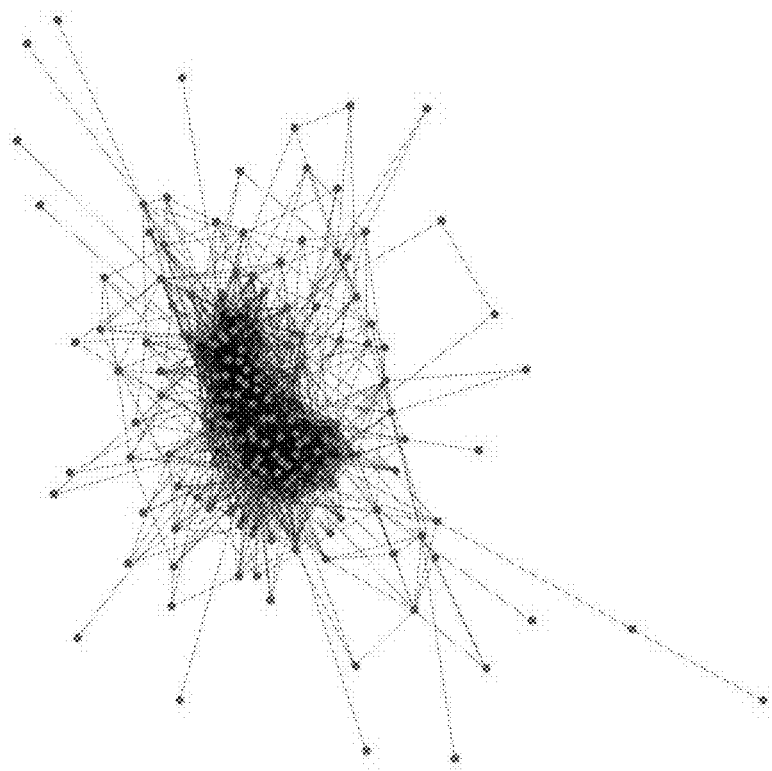
FIGS. 2A and 2B illustrate graph networks in an embodiment.
Figure 2A:
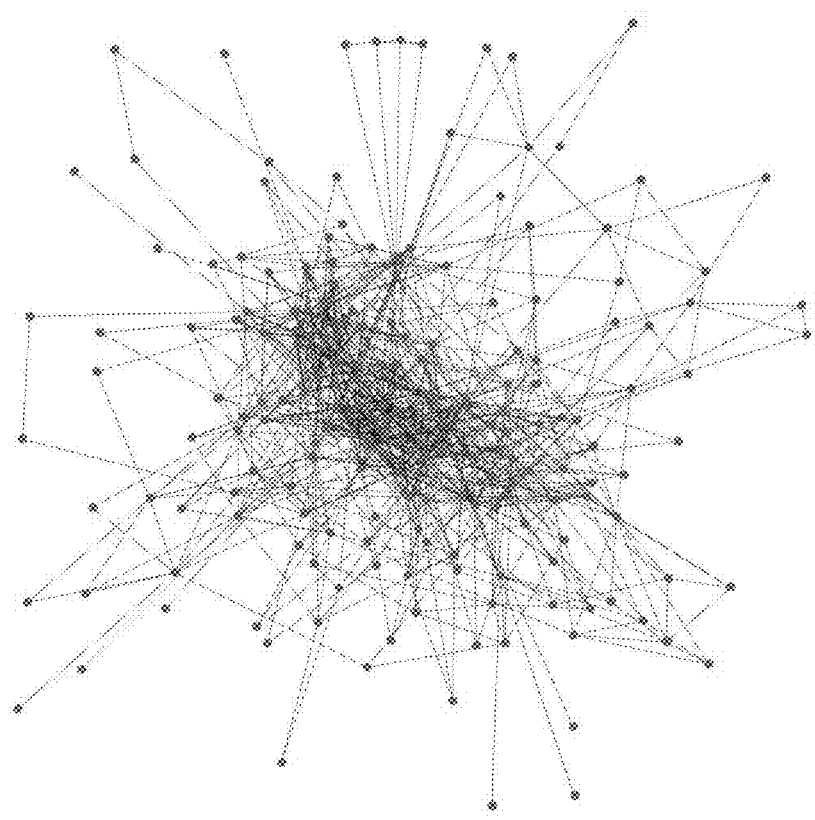

FIGS. 2A and 2B illustrate a subset of the connections in the financial network datasets (MRFN) in an embodiment. Each entity (e.g., represented by their stock symbol or another representation) represents a node in the MRFN. FIG. 2A shows an example layer 1 MRFN incorporating search relationships among entities. FIG. 2B shows an example layer 2 MRFN incorporating equity correlation among entities.

Nodal Features and Labels for Climate Risk Assessment

The system in an embodiment assesses the impact of acute climate change risk on firms. Acute climate change refers to the hazards that are event driven hazards that occur due to food, hurricanes and other episodic events. Climate change impact indicator (CCII) is a methodology developed to assess the impact of acute and chronic climate change which is based on capturing the interaction of climate variables and the equity prices and transmission of climate risk to asset returns. The system in an embodiment can use these statistical interactions between the equity prices and the climate variables as the node features. These interactions capture mean risk, volatility risk and trail risk transmissions of the climate change variables on firms.

Using CCII, the system in an embodiment computes the acute climate change risk score, for example, which is between (0-6). The risk of the firms is divided into 3 classes. The system in an embodiment buckets the firms into low risk (0-2), medium risk (3-4), high risk (5-6) based on the CCII range and assign the nodes their respective classes. For example, in an experimental dataset, the final dataset can include of 215 firms, 20 statistical interaction terms between acute climate change variables and firms' statistics which act as node features, two adjacency matrices representing the two layers of the network and three class labels that the system would predict using the semi-supervised GCN classification technique.

Nodal Features and Labels for Credit Risk Assessment

In an embodiment, the system assesses corporate bankruptcy of firms using five fundamental financial ratio and computes the Z-score of the firms in the sample using the features: (working capital/total assets); (retained earnings/total assets); (earnings before interest and other expenses/total assets); (market value of equity/book value of total liabilities); (sales/total assets). The system in an embodiment aims to predict credit risk using measures of liquidity of assets and profitability which are (working capital/total assets) and (retained earnings/total assets) respectively.

The risk of the firms is divided into 3 classes. The three class/node labels for firms are assigned based on their Z-score cutoffs: Z>2.99—"Safe" Zone; 1.81<Z<2.99—"Grey" Zone; Z<1.81—"Distress" Zone. In this example, the final dataset can include 194 companies, two financial parameters/features, two adjacency matrices representing the two layers of the network and three class labels that the system would predict using the semi-supervised GCN classification technique.

Multi-Relational GCN for Climate and Credit Risk Prediction

Given MRFN data, the system can predict credit/climate risk of target (unlabeled) firms, for example, in instances even when training has only access to a subset of labeled firms with known risk levels. In an embodiment, in the credit risk problem, the system may classify the firms into 'safe', 'grey' and 'distress' zones. In the climate risk problem, the system may classify the firms into 'low', 'medium' and 'high' risk buckets as a result of impact from acute climate change.

In an embodiment, the system may formulate the aforementioned problem as a semi-supervised node classification problem by leveraging GCN based learning methods. However, different from the vanilla GCN, the system works with a multi-relational GCN (MR-GCN), which takes into account the effect of multiple MRFN layers on node classification. Particularly, the system may evaluate or consider two graph representations in MR-GCN, weighted graph representation and supra-graph representation, each of which generalizes the notion of a uni-relational (single-layer) network.

For explanation, the following graph notations are introduced for a MRFN. Let $\mathcal{G} = (\mathcal{V}, \{\mathcal{E}^{(k)}\}_{k=1}^{K})$ denote an undirected MRFN of K=2 layers, where $\mathcal{V}$ is the vertex (or node) set with cardinality $|\mathcal{V}|=N$, and $\mathcal{E}^{(k)} \in (\mathcal{V} \times \mathcal{V})$ denotes the edge set for the MRFN layer k. Let $A^{(k)}$ represent an adjacency matrix given $(\mathcal{V}, \mathcal{E}^{(k)})$, where $A_{mn}^{(k)}=0$ if $(m, n) \notin \mathcal{E}^{(k)}$. In the vanilla GCN, K=1 is implicitly assumed.

GCN

For explanation, the following setup of GCN is used for semi-supervised node classification, where each node i is associated with a feature vector $x_i \in \mathbb{R}^d$ and a one-hot label $y_i \in \mathbb{R}^C$ of C classes. The goal of GCN is to classify unlabeled nodes using the graph topology A, node features $X=[x_1, x_2, \ldots, x_N]^T \in \mathbb{R}^{N \times d}$, and known node labels $\{y_i\}_{i \in \Omega}$, where $\Omega$ denotes the set of node indices that have labels. An L-layer GCN obeys the following propagation rule to find node embeddings, $$H_l = \sigma(\tilde{A} H_{l-1} W_{l-1}), l \in [L], \quad (1)$$

where $W_{l-1} \in \mathbb{R}^{M_{l-1} \times M_l}$ represents the model parameters (to be designed) at the lth layer, $H_l \in \mathbb{R}^{N \times M_l}$ denotes the node representations at the lth layer with $H_0=X$, [L] represents the integer set $\{1, 2, \ldots, L\}$, $\sigma(\cdot)$ is the ReLU activation function, and $\tilde{A}$ denotes the normalized adjacency matrix $\tilde{A} = \hat{D}^{-1/2} \hat{A} \hat{D}^{-1/2}$. Here $\hat{A}=A+I$ and $\hat{D}$ is the degree matrix of $\hat{A}$. Based on (1), a classification function (e.g., softmax) $z=f(H_L) \in \mathbb{R}^{N \times C}$ then maps the per-node representation to the per-node classification scores over C classes. To determine the parameters of GCN $\{W_l\}$, the system may then minimize the cross-entropy (CE) loss over the labeled nodes $\{i \in \Omega\}$:

$$\mathcal{L}(W; A, X, \{y_i\}_{i \in \Omega}) = \Sigma_{i \in \Omega} \Sigma_{c=1}^{C} (y_{i,c} \log(z_{i,c})), \quad (2)$$

where $y_{i,c}$ denotes the cth entry of the vector $y_i$.

An Embodiment of MR-GCN

The system introduces MR-GCN, which allows multiple types of interactions between nodes. In an embodiment, the system may consider two multi-layer network representation methods: network aggregation and supra-graph. The former can be cast as a convex combination (e.g., linear combination) of graph adjacency matrices across all layers. The latter generates a supra-graph that maps a node-layer combination to a supra-node.

Network aggregation. Given two adjacency matrices $\{A^{(k)}\}_{k=1}^{2}$ associated with the two layers of a MRFN, the aggregated MRFN is given by $$A = \lambda A^{(1)} + (1-\lambda) A^{(2)}, \quad (3)$$

where $\lambda \in [0,1]$ is regularization parameter. Substituting (3) into (1), GCN can then be extended to MR-GCN via network aggregation (referred to herein as MR-GCN-A).

Supra-Graph

To model MRFN by a standard graph formulation, the system can also define a 'supra-node' that is mapped to a node-layer tuple, i.e., $(v \in \mathcal{V}, k \in [K])$. This leads to a supra-adjacency matrix, where supra-nodes (v, k) and (v', k') are connected in two cases: (1) Intra-layer connection as k=k' and $(v, v') \in \mathcal{E}^{(k)}$ for $k \in [K]$; (2) Inter-layer connection as v=v' (for the same node indices across all layers). As a result, the adjacency matrix of the supra-graph can be formulated as $$A = \begin{bmatrix} A^{(1)} & I \\ I & A^{(2)} \end{bmatrix}, \quad (4)$$

where I denotes the N×N identical matrix. Substituting (4) into (1), GCN is then extended to MR-GCN by supra-graph (referred to herein as MR-GCN-S). In an embodiment, the supra-graph representation (4) can result in 2N node embeddings. Thus, an averaging pooling over embeddings for the same nodes across layers is used to produce N-dimensional node representations $H_L$ prior to performing node classification $z=f(H_L)$ that is optimized in (2).

Figure 3:
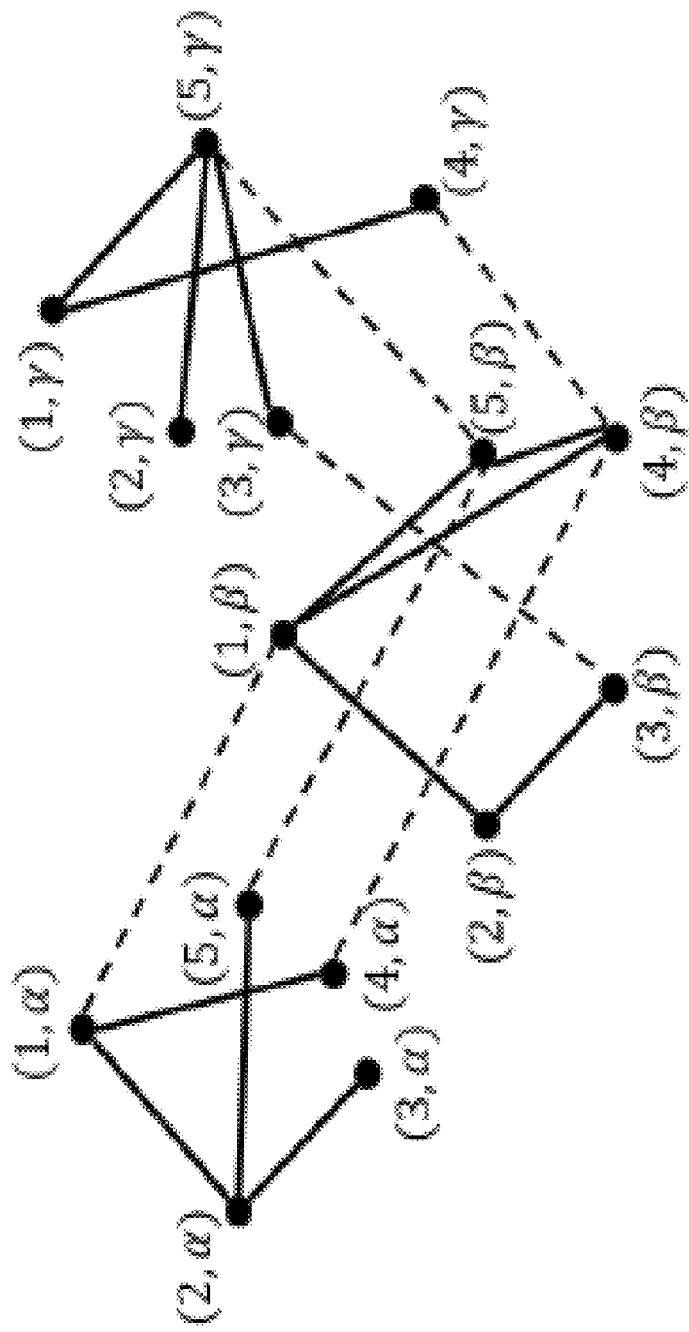
FIG. 3 illustrates an example of supra-graph in an embodiment.

FIG. 3 illustrates an example of supra-graph in an embodiment. The example shows three layers (or 3 graphs), e.g., α, β and γ, some of whose nodes are inter-connected. Within each layer, some of the nodes are intra-connected. By way of example, α-network can be a supply chain network, β-network can be an investment network, and γ-network can be insurance network.

Network Sparsity

In an embodiment, the system can consider the sparsity of MRFN and how the sparsity of MRFN affects the classification accuracy. In an aspect, network sparcity can be introduced which may prevent or reduced the generated MRFN suffering from network construction error due to the presence of data noise and the sub-optimality of the used network generation methods. In another aspect, network sparcity can be introduced, for instance, since the promotion of edge sparsity during training may improve the generalization-ability of GCN. In an embodiment, the system can infuse different levels of sparsity in the network layers.

In an embodiment, the system may consider two types of sparsity, deterministic sparcity and stochastic sparcity. In implementing deterministic sparsity, the system may predefine the thresholds or cutoffs for the association or links in both the network layers at p % of their respective values as MRFN is generated. Example values to consider can include, but are not limited to, p E {20,40,60,80}. The cutoffs determines the number of edges or the strength of association in the network layers. In implementing stochastic sparsity, the system may randomly drop intra-layer edges in MRFN at each training epoch. Once the individual network layers are made sparser, they are combined or collapsed as per the variations described above in MR-GCN-A and MR-GCN-S.

MR-GCN techniques described above in one or more embodiments can predict climate risk and credit risk of firms. Experimental results show multi-relational graph learning and stochastic sparsity infusion can improve the classification accuracy in GCN machine learning. The following illustrates example implementations. For instance, an example of machine learning architecture can include, but are not limited to, GCN models of 2 layers with ReLu as activation function in the hidden layer and softmax as activation function in the output layer. For training and testing, the MRFN datasets can be split into different scenarios, for example, ranging from 2%/98% training/testing to 80%/20% training/testing. During training, the system may use Xavier initialization and the Adam optimizer to train the model weights within 100 epochs. During performance evaluation, averaged results of 20 runs can be reported. The system may use both unweighted/binary and weighted network layers.

Experimental results further show that climate change risk as well as credit risk on the network of firms can captured in the online search pattern of investors. Experimental results also show that the second MRFN layer contributes to the classification accuracy of credit risk prediction. It is also shown that the MR-GCN-A outperforms the uni-relational GCN (UR-GCN) for the climate risk problem as well as the credit risk problem, both with binary and weighted MR-GCN-A. Similarly, the MR-GCN-S formulation of combining both network layers also results in a higher classification accuracy than UR-GCN.

Experimental results also show that promoting sparsity, e.g., any combination of deterministic vs. stochastic, MR-GCN-A vs. MR-GCN-S and binary and weighted multi-layered graph topologies. Example sparsity levels can include, but are not limited to, 50% to 100%. For instance, based on different problems (e.g., credit risk, climate risk) and models (e.g., MR-GCN-A, MR-GCN-S) used, stochastic sparsity can range from 50%-80%. An optimal sparsity helps in reduction of noise in the network and helps obtain high information from them. Experimental results shown that sparsity can boost MR-GCN classification accuracy.

The system in an embodiment creates graph-based datasets or multi-relational financial network (MRFN) layers that could be used for evaluating the financial domain, for example, for machine learning and prediction. Two methodological variants of the graph convolutional network (MR-GCN-A and MR-GCN-S) can provide improvements over UR-GCN, for example, which can be applied to solve the climate risk and credit risk classification problems in the domain of finance. For example, using MRFN layers and incorporating financial wisdom of investors and the sentiment of investors, the system can predict the risk better. The system may implement sparsity infusion to network layers, which can reduce noise and achieve peak classification accuracies. Incorporating the network information to solve problems in financial domains provides accuracy in solutions, for example, as firms become more interconnected. The system also can implement variations in the algorithms for solving problems, e.g., in the field of finance.

In an aspect, the machine learning disclosed herein can address the impact of climate change risk on the financial firms. CCII can capture the climate change impact and can be used in running an MR-GCN model, which incorporates network information.

FIG. 1 is diagram illustrating an MR-GCN method for predicting risk in financial domain in an embodiment. The method can be performed or implemented by computer-implemented components, for instance, one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

An MR-GCN in various embodiments, for example, as described above can be trained and run to predict a risk, for example, predict credit risk and/or climate risk. Different embodiments can include a MR-GCN that predicts credit risk of an entity or firm, a MR-GCN that predicts climate risk of an entity or firm. In one embodiment, MR-GCN can be architected to implement network aggregation, e.g., MR-GCN-A as described above. In another embodiment, MR-GCN can be architected to implement supra-graph, e.g., MR-GCN-S as described above. In one embodiment, MR-GCN can be architected to implement sparsity. In one embodiment, MR-GCN can be architected to implement binary or unweighted edges. In another embodiment, MR-GCN can be architected to implement weighted edges. Multi-relational network can include 2 or more layers, e.g., 2 or more networks.

Referring to FIG. 1, a processor may receive input data 102, for example, via one or more application programming interface (API) data connectors. Input data can include market price data 104, weather event data 106, knowledge graphs (which contain information about entities or firms) 108, other data such as loan data, credit history 110. At 112, the processor may compute a climate change impact indicator (CCII) for each entity as a node feature. For example, for training an MR-GCN for predicting climate risk, an MRFN (also referred to as MRFN-climate, e.g., see Table 1) can be created or built whose nodes represent entities or firms and edges represent association between the firms. Node features are CCII, and node labels can be risks, for example, classified as low, medium and high. Other classification is possible. Computing CCII may include computing weather intensity at 114, computing trend of excess return of a firm at 116 and calculating climate change impact indicator (CCII) at 118 as a node feature. Details of computing CCII is described herein. For example, at 112, a multi-relational financial network for use in climate risk prediction can be created.

At 120, based on the input data 102, the processor can also compute a financial score, e.g., the Altman Z-score, and use such a score as node features for training an MR-GCN for predicting credit risk. Node labels can be risks, for example, classified as safe, grey, distress (Other classifications can be implemented). For instance, an MRFN (also referred to as MRFN-credit, e.g., see Table 1) can be created or built, whose nodes represent entities or firms, and edges represent association between the firms. For example, at 120, a multi-relational financial network for use in credit risk prediction can be created.

At 122, an MR-GCN can be trained and/or run. Node embedding can be performed using network aggregation or supra-graph. Node embedding is shown by Equation (1) above, in an embodiment. For example, at 124, an MR-GCN can be architected to implement network aggregation for combining the layers of the multi-relation graph (e.g., MRFN). Network aggregation implementation is shown in Equation (3) above, in an embodiment. In another embodiment, at 126, an MR-GCN can be architected to implement supra-graph for combining the layers of the multi-relation graph (e.g., MRFN). Using supra-graph, aa supra-adjacency matrix can be built where supra-nodes are connected intra-layer and inter-layer. Supra-graph implementation is shown in Equation (4) above, in an embodiment.

In an embodiment, at 128, the processor may infuse sparsity, e.g., in building or architecting the MR-GCN, e.g., in formulating or building the adjacency matrix. Sparsity can be infused based on a predefined or configured threshold, e.g., into aggregated or supra-graph. At 130, the architected MR-GCN can be trained, e.g., based on minimum cross-entropy loss, for example, shown with Equation (2) above, in an embodiment. MR-GCN can predict a given or select firm's risk indicator based on known firm's risk indicator.

The trained MR-GCN can be run to predict an entity's risk. For example, an MR-GCN trained above using MRFN-climate graph dataset can be used to predict a climate risk for a given or selected firm. An MR-GCN trained above using MRFN-credit graph dataset can be used to predict a credit risk for a given or selected firm. For example, a computer or another device 132 may run a user interface (e.g., a graphical user interface (GUI)) to select a firm or entity, whose risk is to be predicted. An MR-GCN can be run (e.g., at 130) to predict a given or select firm's risk indicator based on known firm's risk indicator. The selected firm's neighbor information based on graph connectivity (e.g., MRFN-climate graph dataset or MRFN-credit graph dataset) and its neighbor's risk indicator can be input to the trained GCN. For example, the selected firm's climate change risk indicator can be output as shown at 134. Shown at 136, the selected firm's credit risk category can be output. The output can be presented via the user interface (e.g., GUI) 132 on a computer or another device.

Figure 4:
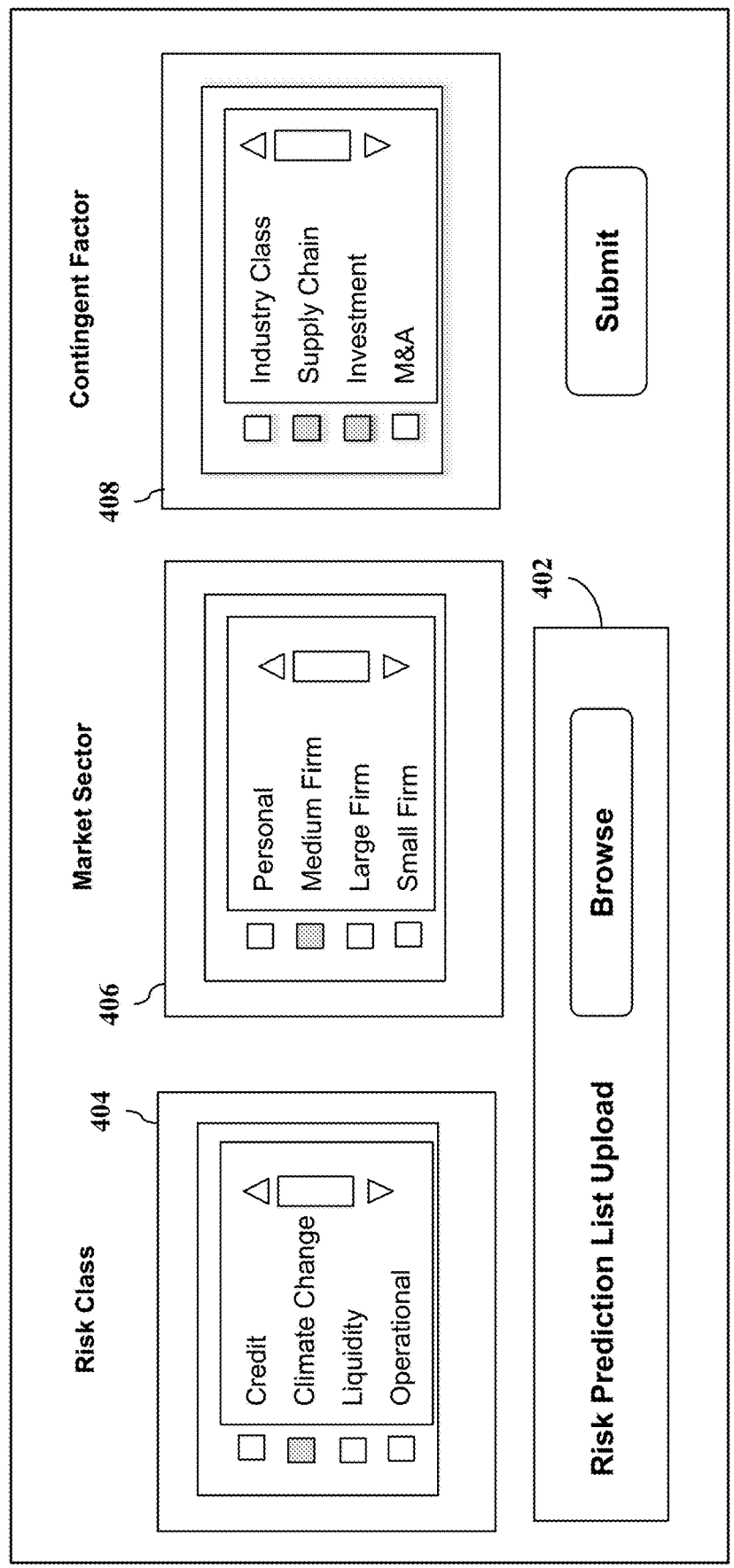
FIG. 4 is a diagram illustrating a user interface for performing risk prediction in an embodiment.

FIG. 4 is a diagram illustrating a user interface for performing risk prediction in an embodiment. Via the user interface, a user can interact with an MR-GCN training and prediction system or tool. For instance, a user can upload a list of firms to predict its selected risk class based on selected contingent factors. For example, a list of firms can be uploaded using the graphical element shown at 402. Selections can be made using graphical elements shown at 404, 406, 408, which allow users to specify the risk class, market sector and contingent factor, in performing risk prediction. For instance, the contingent factor selection at 408 allow users to select a plurality of networks to consider in creating a multi-relational financial network, e.g., an example of which is shown in FIG. 3.

Figure 5:
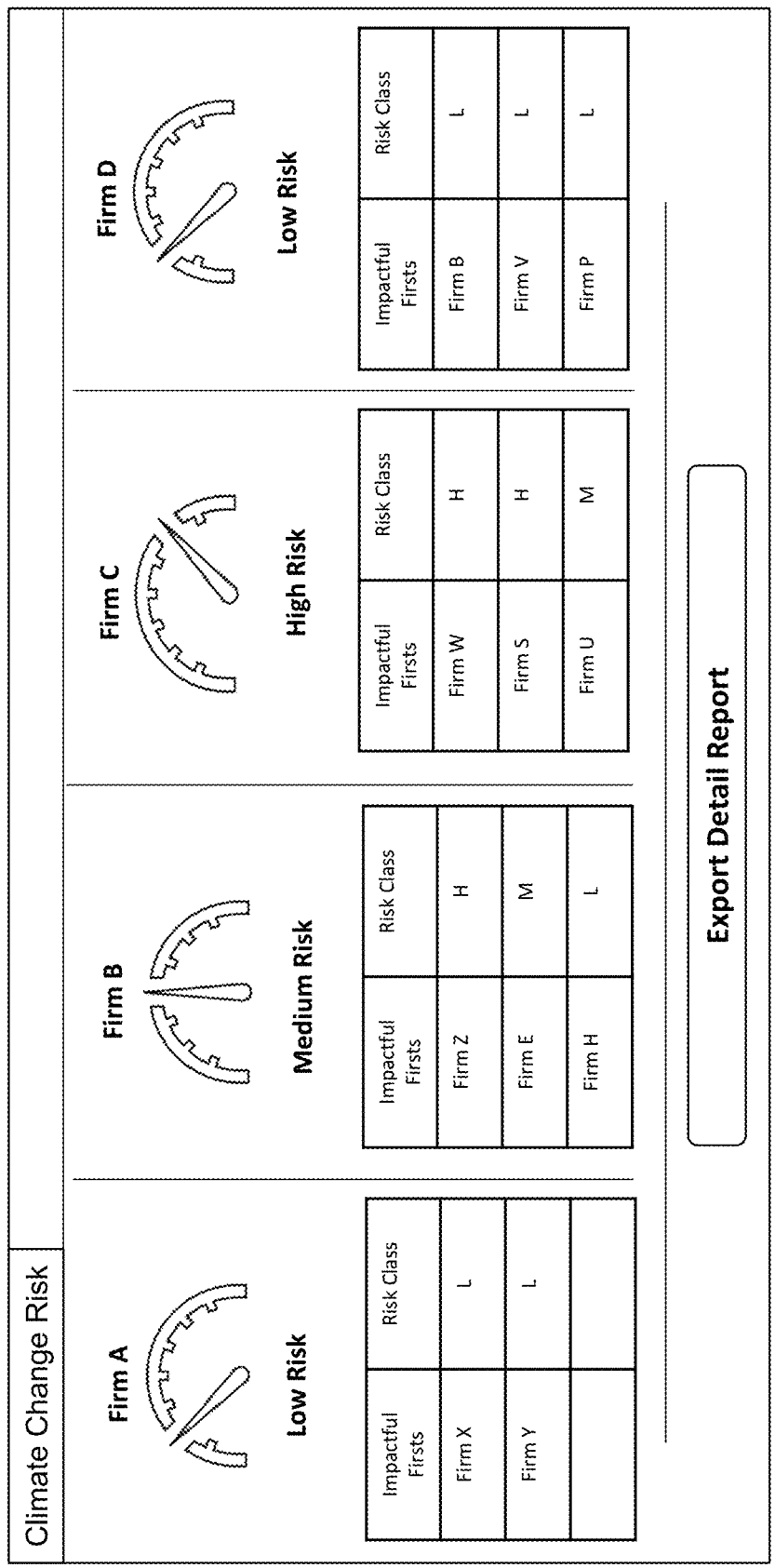
FIG. 5 is a diagram illustrating another example user interface in an embodiment.

FIG. 5 is a diagram illustrating another example user interface in an embodiment. This user interface shows firms or entities with levels of climate risk, for example, determined by an MR-GCN in an embodiment.

Based on credit risk of known entities in the network, a system and/or method can predict credit risk of another entity. Similarly, based on climate risk of known entities in the network, climate risk of another entity can be predicted. Multi-relational graph can include multiple layers. For example, two layers can include a co-search knowledge graph of entities and equity correlation of the same set of entities. The edges can be one of binary and weighted edges. In an embodiment, National Ocean Atmospheric Administration (NOAA) extreme weather database can be used to calculate the trend of extreme weather events, which can be used to calculate climate change impact indicator (CCII). Based on the CCII, climate change risk can be determined or classified, e.g., Low Risk: CCII (0-2); Medium Risk: CCII (3-4); High Risk: CCII (5-6). For instance, weather events causing economic damage can be classified based on their nature and common characteristics. In an embodiment, such events can be classified into five groups: windstorms, winter related and snowstorms, dry heat and fire related events, flood related events, and land related events. Windstorms group can include events such as strong wind, thunderstorm wind/tree, thunderstorm wind/trees, thunderstorm winds lightning, thunderstorm winds/flood, thunderstorm winds/flooding, tornadoes, tstm (thunderstorm) wind, hail, thunderstorm wind, tornado, high wind, lightning, marine high wind, marine, hurricane/typhoon, marine lightning, marine strong wind, waterspout, marine thunderstorm wind, hurricane, hurricane (typhoon), tropical depression, tropical storm, funnel cloud. Winter related and snowstorms group can include events such as winter storm, cold/wind chill, winter weather, blizzard, ice storm, heavy snow, marine hail, hail, freezing fog, extreme cold/wind chill, sleet, frost/freeze, lake-effect snow. Dry heat and fire related events group can include events such as wildfire, volcanic ash, drought, excessive heat, heat. Flood related events group can include events such as coastal flood, flash flood, flood, heavy rain, tsunami, storm surge/tide, seiche, high surf, rip current, lakeshore flood. Land related events group can include events such as avalanche, landslide, dust storm, dust devil, debris flow, dense fog, dense smoke, marine dense fog. Monetary or dollar implications of climate change can be observed and modeled.

The following illustrates climate metrics and their definitions in an embodiment. Temperature anomaly includes a difference between mean temperature during the base period and the average temperature of that particular year. Precipitation anomaly includes a difference between mean precipitation during the base period and the precipitation of that particular year. Climate extremes index (USCEI) includes an index that captures the extremes in different climate measures, namely temperature, precipitation and PDSI. Green House Gas emissions can include constituents, which can include carbon dioxide, methane, nitrous oxide and fluorinated gases (measured in million metric tons).

In an embodiment, market price data can be used to compute the finance features and derive the Z score, an indicator of credit risk. Based on known entities in the network, the system and/or method can predict the credit risk of other entities, e.g., Z score range: Z>2.99—"Safe" Zone; 1.81<Z<2.99—"Grey" Zone; Z<1.81—"Distress" Zone. Ratio analysis can be used as an analytical technique to predict corporate bankruptcy, giving each entity or firm a score, e.g., Z-score. Such score can be used as a node feature. An MR-GCN model can be trained on such node features. For example, node features can include the following measures.

| Variable Definition | Variable Definition |
|---|---|
| $X_1$(Measures liquid assets in relation to the size of the entity) | working capital/total assets |
| $X_2$(Measures profitability that reflects the entity's age and earning power) | retained earnings/total assets |
| $X_3$(Measures operating efficiency apart from expenses and leveraging factors. It recognizes operating earnings as being important to long-term viability) | earnings before interest and other expenses/total assets |
| $X_4$(Adds market dimension that can show up security price fluctuation as a possible red flag) | market value of equity/book value of total liabilities |
| $X_5$(Standard ratio illustrating the sales generating ability of the entity's assets) | sales/total assets |

The following describes climate change impact indicator methodology in an embodiment. In an embodiment, the construction of climate change impact indicator (CCII) is based on the hypothesis that impact of long-term trends in climate change can be seen through long term trends in asset returns. The CCII methodology is based on capturing the interaction of climate variables and the equity prices and transmission of climate risk to asset returns. A goal is to build a climate risk indicator that can be universally and generally accepted to evaluate the climate risk impact assessment on entities or firms. It is observed that the financial markets may incorporate the climate risk and hence studying the impact of climate risk through asset price returns may help quantify the climate risk on firms. In an embodiment, a proxy for asset price returns which are the stock price returns of public firms can be broken down and systematically analyzed with respect to climate risk transmission. Extraction of long-term behavior of climate variables and asset returns helps identify the transmission of long-term risk from climate variables to the firms.

Any long-term risk in the asset price returns distribution can be captured using specific statistics of mean, volatility and tail characteristics of the distribution. In an embodiment, for analyzing the climate risk impact, the market return component is removed from the equities returns and it works with excess equity returns. By applying the standard Geometric Brownian motion equity price model on the daily excess equity returns, the expected annual excess returns and annual volatilities of the stocks are computed. Excess downside risk or heavy losses due to an extreme weather event or a deteriorating climate can be better captured in the left tail characteristics of the distribution and hence the annual one percentile and annual conditional mean at one percentile of the distribution are computed. The slopes of the annual trends for each of the four statistics very well capture the long-term risk in equities. Climate risk impact assessment on firms can include classifying the climate risk into acute climate risk and chronic climate risk. Like stocks, the long-term risk in the climate variables is analyzed using their annual statistics.

Acute climate hazards are referred to those event driven hazards that occur due to floods, hurricanes and other episodic events. The risk arising from the acute climate change is captured by the acute climate variables. The impact of acute climate risk can be measured by identifying the economic impact caused by the extreme weather events beginning at a defined period. The data on the extreme weather events provided by, e.g., available sources, e.g., NOAA (National Oceanic Atmospheric Administration) can be cleaned and processed to form a time series of their extreme weather events along with their respective economic damage. The proxy for economic damage is damage to property as given in the NOAA datasets. Since these events are sporadic, the general duration of events is approximated to understand what the right granularity for the time series of these extreme weather events is.

In an embodiment, there is a preliminary grouping criterion to classify all the historic extreme weather events into five classes based on the nature of the events. For example, the five groups namely are (1) windstorm events—thunderstorms, lightning, tornados, hurricanes etc.; (2) winter related events—blizzards, marine hail, sleet etc.; (3) dry heat and fire related events—wildfire, draught, volcanic ash etc.; (4) flood related events—coastal floods, tsunamis, seiche etc.; (5) land related events—avalanche, landslides, dust devil etc. All these are extreme weather events as identified by the NOAA and they are aggregated into the five groups. This way there is a time series of the dollar economic damage caused by the groups and it now becomes easier to analyze the impact of these five groups on the firms. These five groups are the acute climate variables in CCII.

Chronic climate hazards are referred to those non episodic or nonevent driven hazards that occur due long-term shifts in the climate patterns like sustained higher temperature or sustained precipitation anomalies. The risk arising from the chronic climate change is captured by the chronic climate variables. The impact of chronic climate risk is measured by studying two such chronic variables: temperature anomalies and precipitation anomalies beginning the defined period, e.g., provided by NOAA. Temperature anomaly is defined as the difference between the mean temperature during the base period and the average temperature of the particular month and precipitation anomaly is defined as the difference between the mean precipitation during the base period and the average precipitation of the particular month.

Impact of acute and chronic climate variables can be evaluated in terms of their annual means, annual volatility and tail risk characteristics. The tail risk is further evaluated by measuring the 95th and 99th percentiles and conditional mean above 95th and 99th percentiles. The trends of these statistical metrics can be used to understand acute and chronic climate change. Developing climate change impact indicator includes defining the notations of climate variables and the firm statistics which are the inputs to the climate change impact indicator. The acute and chronic climate change indicators are separated as the respective impact from both will be different on different firms. However, the construct of the indicator can remain the same.

Acute and Chronic Climate Slopes Notations

Let $Y_{ja}$, where j=1 ... 5, be an acute climate variable. There are 5 NOAA data based dollar damage climate variables (group1-group5).

Let $Y_{jc}$, where j=1 ... 2, be an chronic climate variable. There are 2 chronic variables (temperature and precipitation anomalies) to understand chronic climate change.

Let m be the slope of the trend line fitted to each annual statistical measure for a climate variable:

$m_\mu$—slope of the trend line for annual mean of a climate variable.

$m_\sigma$—slope of the trend line for annual volatility of a climate variable.

$m_{p_{95}}$—slope of the trend line for annual $95^{th}$ percentile level of a climate variable.

$m_{p_{99}}$—slope of the trend line for annual $99^{th}$ percentile level of a climate variable.

$m_{cp_{95}}$—slope of the trend line for annual conditional mean above $95^{th}$ percentile level of a climate variable.

$m_{cp_{99}}$—slope of the trend line for annual conditional mean above $99^{th}$ percentile level of a climate variable.

Stock Slopes Notations

Let $\alpha_i$, where i=1 ... I, be the excess return of firm i for the I firms in the sample.

Excess daily return is defined as $\alpha_i = r_i - r_m$, where $r_i$ is the daily firm i equity return and $r_m$ is daily equity market return.

Let m be the slope of the trend line fitted to each annual statistical measure for a firm's equity excess return:

$m_{\alpha_\mu}{}^i$—slope of the trend line for annual mean of excess equity return for firm i.

$m_{\alpha_\sigma}{}^i$—slope of the trend line for annual volatility of excess equity return for firm i.

$m_{\alpha p1\%}{}^i$—slope of the trend line for annual $1^{st}$ percentile level of excess equity return for firm i.

$m_{\alpha cp1\%}{}^i$—slope of the trend line for annual conditional mean below $1^{st}$ percentile level of excess equity return for firm i.

The indicator function is defined as:

$$\mathcal{J}_{\{x>0\}} = \begin{cases} 1 & \text{if } x > 0 \\ 0 & \text{if } x \leq 0 \end{cases}$$

CCII Indicator

In an embodiment, the key hypothesis is that impact of long term trends in climate change can only be seen through long term trends in equity returns. Hence the climate change impact indicator is defined as below:

Acute CCII on Firm i is Defined as Follows:

$$I_a^i = \sum_{j=1}^{J} \mathcal{J}_{\{m_{\mu_j}>0\}} \cdot \mathcal{J}_{\{m_{\alpha_\mu}^i<0\}} + \sum_{j=1}^{J} \mathcal{J}_{\{m_{\mu_j}<0\}} \cdot \mathcal{J}_{\{m_{\sigma_j}>0\}} \cdot \mathcal{J}_{\{m_{\alpha_\sigma}^i>0\}} +$$

$$\sum_{j=1}^{J} \mathcal{J}_{\{m_{cp99_j}>0\} \text{ or } \{m_{cp95_j}>0\}} \cdot \mathcal{J}_{\{m_{\alpha_{cp1}}^i<0\}} +$$

$$\sum_{j=1}^{J} \mathcal{J}_{\{m_{p99_j}>0\} \text{ or } \{m_{p95_j}>0\}} \cdot \mathcal{J}_{\{m_{\alpha_{p1}}^i<0\}}$$

Chronic CCII, $I_c^i$, is similarly defined for each firm, i. The only difference being the slopes of the climate variables are now that of temperature anomaly and precipitation anomaly.

Acute Climate Change Impact Indicator (CCII), $I_a^i$, measures the impact of acute climate variables for firm i, similarly Chronic CCII depicted by, $I_c^i$, measures the impact of chronic climate variables on firm i. The relationship between the stock slopes and the the climate variables captures the mean transmission, volatility transmission and tail risk transmission from the climate variables to the equity returns. Each term in CCII captures the transmission of deterioration of climate variable leading to an erosion of the value of stocks.

The CCII can be broken down into four individual components and and each term represents an interaction between the stock variable and the climate variable which can be analyzed further. The first interaction term captures the mean transmission risk where a deterioration of climate meaning an increasing trend of a climate variable reflects a deterioration in the mean trend of the excess stock returns. The second component captures a pure volatility transmission where an increasing volatility in the climate variable increases the volatility of the excess stock returns. The third and the fourth components represent how the tail risk of the climate variables translate to the tail risk of the excess equity returns in terms of conditional means and percentiles.

The system and/or method in various embodiments can implement a climate change impact indicator, model the contingent effects from entity's relationship with other entities, which are also exposed to that risk, using a graph neural network (GNN) or a GCN. Such graph neural network can leverage heterogenous intra-layer and inter-layer relationships, supra-graph representation, and infuse sparsity into network layers to reduce impact of noisy relationships.

The system and/or method in various embodiments can provide more accurate prediction of risk indicators, overcome noisy relationships across multi-layer heterogeneous graphs, provide insights on contingent risk impacts. In an embodiment, based on credit risk and/or climate change risk of known entities in the network, the system and/or method can the credit risk and/or climate change risk of other entities, whose risks are not known. For instance, this prediction can facilitate risk evaluation for new enterprise, e.g., new start-ups, new small-medium-enterprises, which may have no or very limited credit history. The financial impact of real climate change risk trajectory is unknown, and the system and/or method can provide an indicator to proxy it. This prediction can facilitate climate change risk evaluation for enterprises, which may have no or very limited information by leveraging that of known enterprises or entities. This prediction can be combined with traditional risk scores to enhance lending or loan decisions, for example, for any other decisions. The system, for instance, can be a financial risk analytics system that can provide credit risk and financial risk indications due to climate change risk rankings, which can include a novel climate change risk indictor and a novel GNN method that can embed heterogenous intra-layer and inter-layer relationships to better model the contingent impact of entity's risks.

Figure 6:
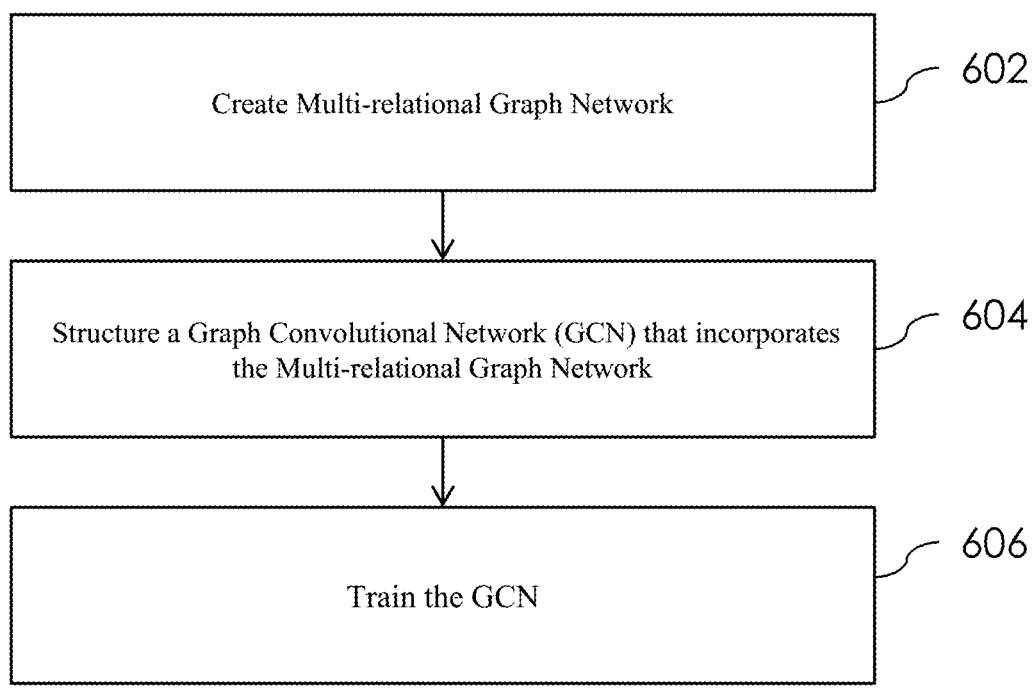
FIG. 6 is a diagram illustrating a method of providing a multi-relational graph convolutional network (GCN) in risk prediction in an embodiment.

FIG. 6 is a diagram illustrating a method in an embodiment. The method can be performed by or implemented on one or more computer processors. The method builds a graph neural network, which can predict a risk, e.g., a climate risk, a credit risk, on one or more entities, firms or companies. At 602, a multi-relational graph network can be created, which includes multiple graph networks, for example, at least a first graph network and a second graph network. The first graph network includes a first set of nodes and a first set of edges connecting at least some of the nodes in the first set. A second graph network includes a second set of nodes and a second set of edges connecting at least some of the nodes in the second set. The first set of nodes and the second set of nodes represent entities. The first set of edges represents a first relationship between the entities. The second set of edges represents a second relationship between the entities.

At 604, a graph convolutional network (GCN) structured to incorporate the multi-relational graph network. In an embodiment, incorporating the multi-relational graph network can include representing the first set of edges in a first adjacency matrix, representing the second set of edges in a second adjacency matrix, and aggregating the first adjacency matrix and the second set of edges and using the aggregated adjacency matrices in computing node embeddings in the graph convolutional network. In another embodiment, incorporating the multi-relational graph network can include forming a supra-graph including adjacency matrix A and using the adjacency matrix A in computing node embeddings in the graph convolutional network, where $$A = \begin{bmatrix} A^{(1)} & I \\ I & A^{(2)} \end{bmatrix},$$

where $A^{(1)}$ represents the first set of edges, $A^{(2)}$ represents the second set of edges, and I represents an identity matrix.

At 606, the GCN can be trained to predict a risk associated with a given entity. In an aspect, the given entity can be represented by a node in the multi-relational graph network.

In an embodiment, the method can also include infusing sparsity, e.g., into GCN. For instance, sparsity can be infused into an adjacency matrix that represents relationships among nodes. In an embodiment, infusing sparsity can include removing some of the edges represented in an adjacency matrix, based on a predefined threshold. In another embodiment, sparsity can be infused by randomly dropping some of the edges represented in an adjacency matrix at each training epoch of the GCN.

In an embodiment, a GCN that predicts a risk on an entity due to climate can have, as a node feature a climate change impact indicator representing an impact of a climate change over a period on an entity represented by the node, an adjacency matrix that represents online searches performed between entities, and another adjacency matrix that represents a correlation of financial returns between the entities.

In an embodiment, a GCN that predicts a credit risk on an entity can have, as a node feature a score representing financial ratios of an entity represented by the node, an adjacency matrix that represents online searches performed between entities, and another adjacency matrix that represents a correlation of financial returns between the entities.

The GCN is a semi-supervised machine learning model. For instance, not all input node features have corresponding labels. For instance, not all entities represented in the input nodes of GCN have corresponding class labels. GCN can learn from those that have corresponding labels and predict the labels of nodes, which do not have corresponding labels.

Figure 7:
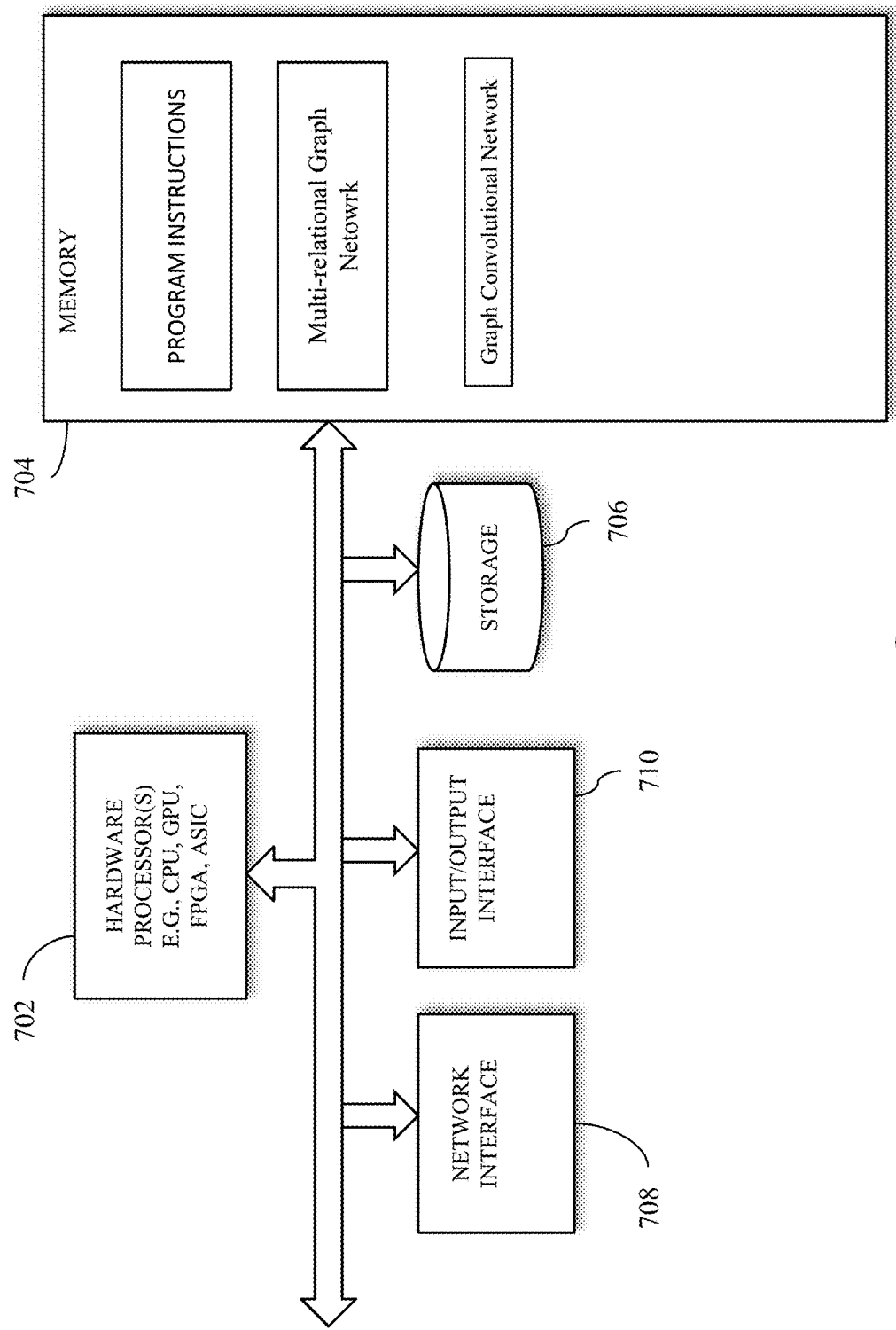
FIG. 7 is a diagram showing components of a system in one embodiment that can build and train a GCN that incorporates multi-relational graph networks.

FIG. 7 is a diagram showing components of a system in one embodiment that can build and train a GCN that incorporates multi-relational graph networks. One or more hardware processors 702 such as a central processing unit (CPU), a graphic process unit (GPU), and/or a Field Programmable Gate Array (FPGA), an application specific integrated circuit (ASIC), and/or another processor, may be coupled with a memory device 704, and generate and/or train a graph neural network prediction model. A memory device 704 may include random access memory (RAM), read-only memory (ROM) or another memory device, and may store data and/or processor instructions for implementing various functionalities associated with the methods and/or systems described herein. One or more processors 702 may execute computer instructions stored in memory 704 or received from another computer device or medium. A memory device 704 may, for example, store instructions and/or data for functioning of one or more hardware processors 702 and may include an operating system and other program of instructions and/or data. One or more hardware processors 702 may receive input including weather data and financial data. At least one hardware processor 702 may generate and/or train a prediction model that predicts or classifies risks such as a climate risk and/or credit risk of an entity. In one aspect, input data may be stored in a storage device 706 or received via a network interface 708 from a remote device and may be temporarily loaded into a memory device 704 for building or generating the prediction or classification model. The learned prediction model may be stored on a memory device 704, for example, for running by one or more hardware processors 702. One or more hardware processors 702 may be coupled with interface devices such as a network interface 708 for communicating with remote systems, for example, via a network, and an input/output interface 710 for communicating with input and/or output devices such as a keyboard, mouse, display, and/or others.

Figure 8:
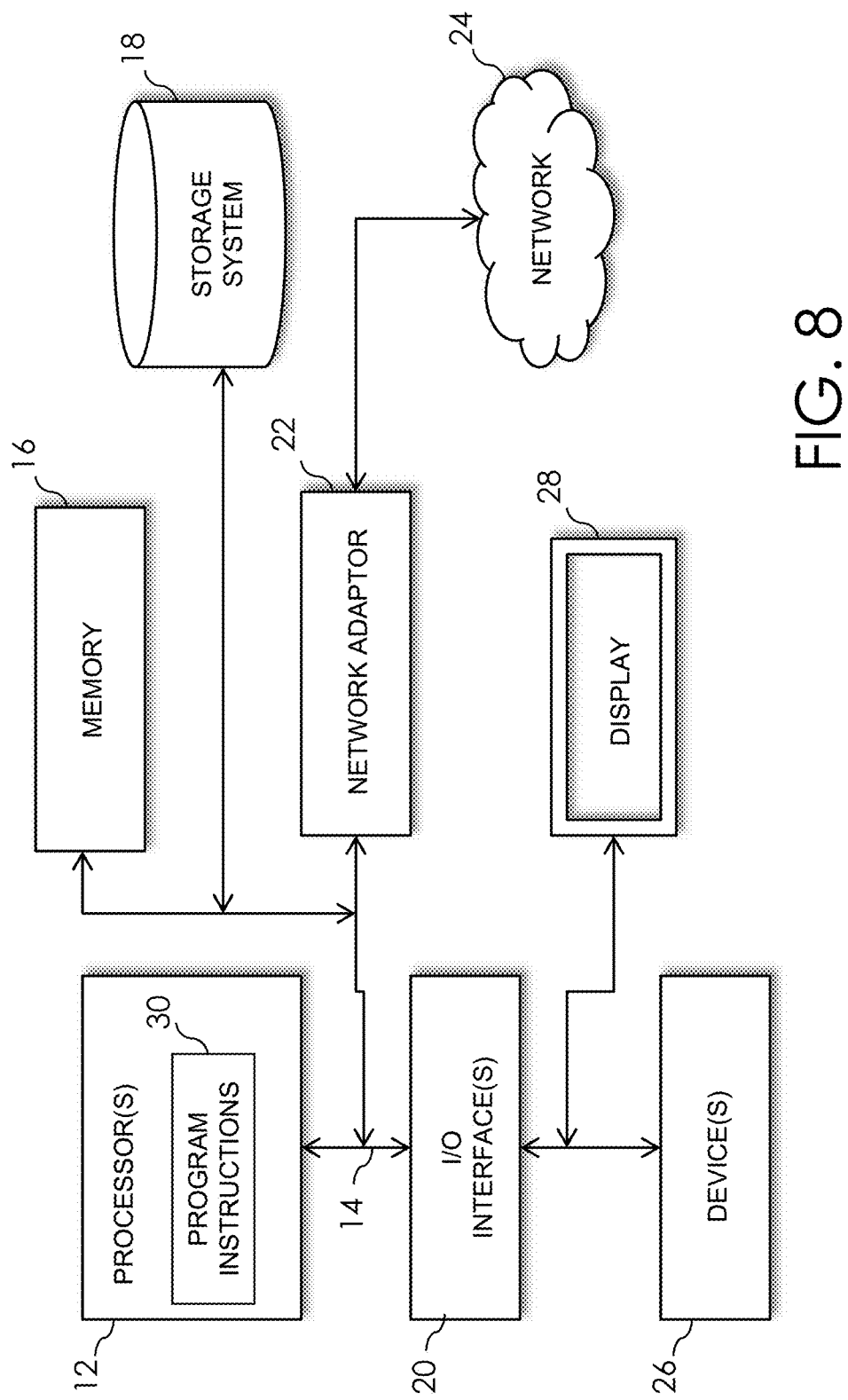
FIG. 8 illustrates a schematic of an example computer or processing system that may implement a system in one embodiment.

FIG. 8 illustrates a schematic of an example computer or processing system that may implement a system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 8 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being run by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
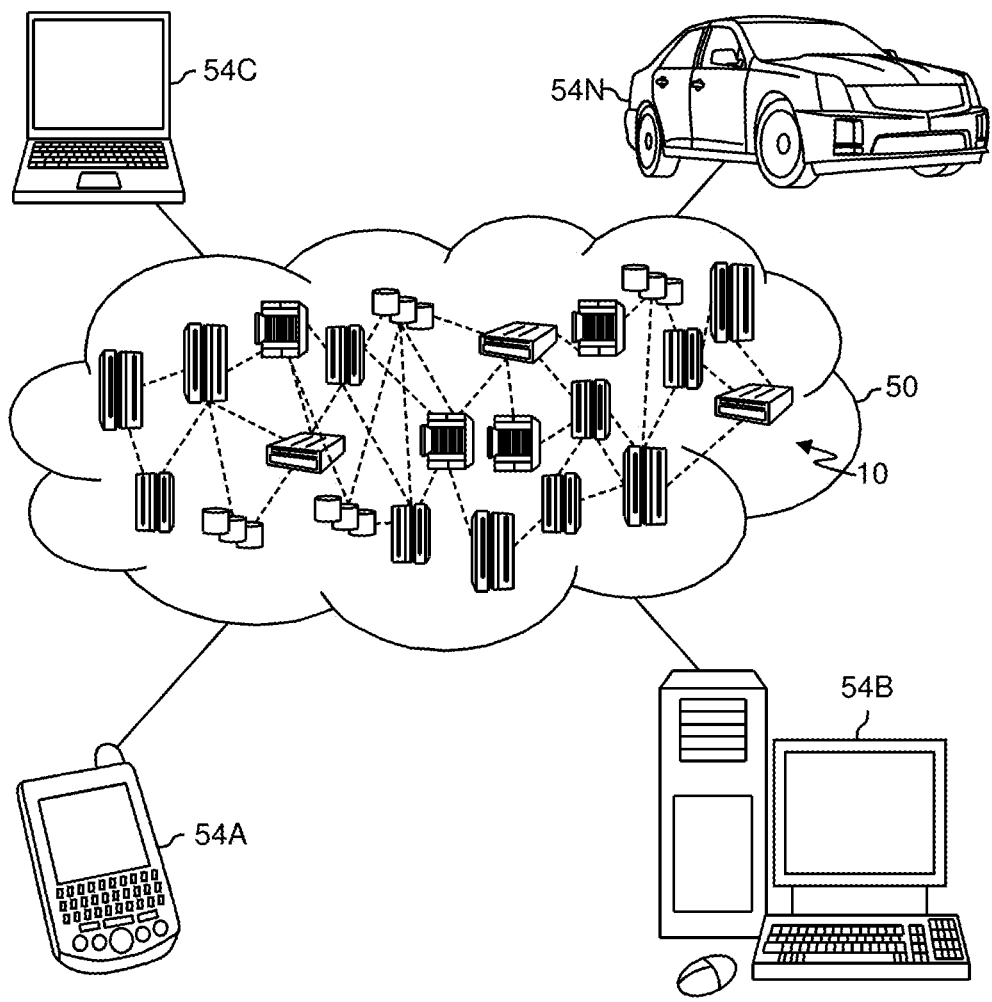
FIG. 9 illustrates a cloud computing environment in one embodiment.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
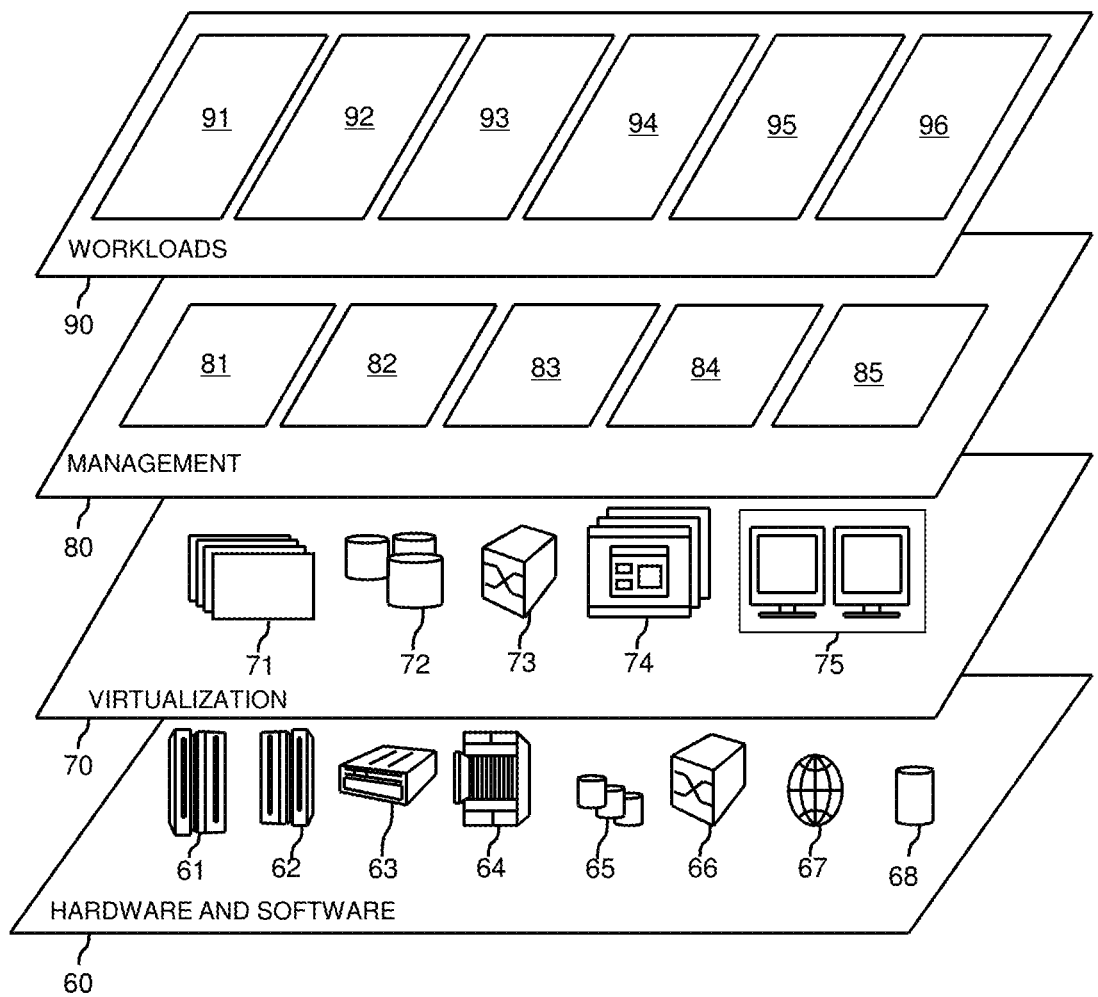
FIG. 10 illustrates a set of functional abstraction layers provided by cloud computing environment in one embodiment of the present disclosure.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and GCN incorporating multi-relational graph network processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, run concurrently, substantially concurrently, in a partially or wholly temporally overlapping manner, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of building a graph neural network to predict a risk on entities, comprising:
creating a multi-relational graph network including at least a first graph network including a first set of nodes and a first set of edges connecting at least some nodes in the first set of nodes, a second graph network including a second set of nodes and a second set of edges connecting at least some nodes in the second set of nodes, the first set of nodes and the second set of nodes representing entities, the first set of edges representing a first relationship between the entities and the second set of edges representing a second relationship between the entities;
structuring a graph convolutional network (GCN) that incorporates the multi-relational graph network;
training the GCN to predict a risk associated with a given entity,
wherein the trained GCN predicts the risk on the given entity due to climate,
wherein for each node in the first set of nodes and the second set of nodes, a node feature for the GCN includes a climate change impact indicator representing an impact of a climate change over a period on an entity represented by the node, the first set of edges represents online searches performed between the entities, and the second set of edges represents a correlation of equity returns between the entities,
wherein an edge connecting one entity and another entity in the first set of edges, represents a number of instances of directional searches performed on said one entity and said another entity immediately within a specified time period,
wherein the training including capturing interaction of climate variables and equity prices and transmission of climate risk to equity returns, the climate variables including variables corresponding to acute climate hazards and chronic climate hazards, and inputting the captured interaction of the climate variables and the equity prices and transmission of the climate risk to equity returns as values of the GCN's node feature corresponding to the climate change impact indicator;
receiving, via a user interface, a selection of the given entity whose risk due to climate is to be predicted;
in response to the receiving of the selection, running the trained GCN to predict the risk for the given entity based on the climate risk of the entities in the trained GCN; and
displaying the predicted risk for the given entity on the user interface.

2. The method of claim 1, wherein said structuring the graph convolutional network (GCN) that incorporates the multi-relational graph network includes representing the first set of edges in a first adjacency matrix, representing the second set of edges in a second adjacency matrix, and aggregating the first adjacency matrix and the second adjacency matrix and using the aggregated adjacency matrices in computing node embeddings in the graph convolutional network.

3. The method of claim 2, further including infusing sparsity into at least one of the first adjacency matrix and the second adjacency matrix.

4. The method of claim 3, wherein infusing sparsity includes removing some of the edges in at least one of the first set of edges and the second set of edges based on a predefined threshold.

5. The method of claim 3, wherein infusing sparsity includes randomly dropping some edges in at least one of the first set of edges and the second set of edges at each training epoch of the GCN.

6. The method of claim 1, wherein said structuring the graph convolutional network (GCN) that incorporates the multi-relational graph network includes forming a supra-graph including adjacency matrix A and using the adjacency matrix A in computing node embeddings in the graph convolutional network, wherein $$A = \begin{bmatrix} A^{(1)} & I \\ I & A^{(2)} \end{bmatrix},$$

wherein $A^{(1)}$ represents the first set of edges, $A^{(2)}$ represents the second set of edges, and I represents an identity matrix.

7. The method of claim 6, further including infusing sparsity into at least one of $A^{(1)}$ and $A^{(2)}$.

8. The method of claim 7, wherein infusing sparsity includes removing some edges represented in $A^{(2)}$ and $A^{(1)}$ based on a predefined threshold.

9. The method of claim 7, wherein infusing sparsity includes randomly dropping some edges represented in $A^{(2)}$ and $A^{(1)}$ at each training epoch of the GCN.

10. The method of claim 1, wherein the GCN predicts a credit risk on an entity.

11. The method of claim 10, wherein for each node in the first set of nodes and the second set of nodes, a node feature for GCN includes a score representing equity ratios of an entity represented by the node, the first set of edges represents online searches performed between the entities, and the second set of edges represents a correlation of equity returns between the entities.

12. A system for building a graph neural network to predict a risk on entities, comprising:
a processor; and
a memory device coupled with the processor;
the processor configured to:
create a multi-relational graph network including at least a first graph network including a first set of nodes and a first set of edges connecting at least some nodes in the first set of nodes, a second graph network including a second set of nodes and a second set of edges connecting at least some nodes in the second set of nodes, the first set of nodes and the second set of nodes representing entities, the first set of edges representing a first relationship between the entities and the second set of edges representing a second relationship between the entities;
structure a graph convolutional network (GCN) that incorporates the multi-relational graph network;
train the GCN to predict a risk associated with a given entity,
wherein the trained GCN predicts the risk on the given entity due to climate,
wherein for each node in the first set of nodes and the second set of nodes, a node feature for the GCN includes a climate change impact indicator representing an impact of a climate change over a period on an entity represented by the node, the first set of edges represents online searches performed between the entities, and the second set of edges represents a correlation of equity returns between the entities, wherein an edge connecting one entity and another entity in the first set of edges, represents a number of instances of directional searches performed on said one entity and said another entity immediately within a specified time period, wherein in training the GCN, the processor is further configured to capture interaction of climate variables and equity prices and transmission of climate risk to equity returns, the climate variables including variables corresponding to acute climate hazards and chronic climate hazards, and to input the captured interaction of the climate variables and the equity prices and transmission of the climate risk to equity returns as values of the GCN's node feature corresponding to the climate change impact indicator;

receive, via a user interface, a selection of the given entity whose risk due to climate is to be predicted;

in response to receiving the selection, run the trained GCN to predict the risk for the given entity based on the climate risk of the entities in the trained GCN; and display the predicted risk for the given entity on the user interface.

13. The system of claim 12, further including the user interface configured to receive the given entity selected by a user.

14. The system of claim 12, wherein the processor is configured to represent the first set of edges in a first adjacency matrix, represent the second set of edges in a second adjacency matrix, and aggregate the first adjacency matrix and the second adjacency matrix, and use the aggregated adjacency matrices in computing node embeddings in the graph convolutional network.

15. The system of claim 14, further including infusing sparsity into at least one of the first adjacency matrix and the second adjacency matrix.

16. The system of claim 12, wherein the processor is configured to form a supra-graph including adjacency matrix A and use the adjacency matrix A in computing node embeddings in the graph convolutional network, wherein A=

$$A = \begin{bmatrix} A^{(1)} & I \\ I & A^{(2)} \end{bmatrix},$$

wherein $A^{(1)}$ represents the first set of edges, $A^{(2)}$ represents the second set of edges, and I represents an identity matrix.

17. The system of claim 16, further including infusing sparsity into at least one of $A^{(1)}$ and $A^{(2)}$.

18. A computer program product comprising a computer readable storage medium having program instructions embodied therewith, the program instructions readable by a device to cause the device to:

create a multi-relational graph network including at least a first graph network including a first set of nodes and a first set of edges connecting at least some nodes in the first set of nodes, a second graph network including a second set of nodes and a second set of edges connecting at least some nodes in the second set of nodes, the first set of nodes and the second set of nodes representing entities, the first set of edges representing a first relationship between the entities and the second set of edges representing a second relationship between the entities;

structure a graph convolutional network (GCN) that incorporates the multi-relational graph network;

train the GCN to predict a risk associated with a given entity, wherein the trained GCN predicts the risk on the given entity due to climate, wherein for each node in the first set of nodes and the second set of nodes, a node feature for the GCN includes a climate change impact indicator representing an impact of a climate change over a period on an entity represented by the node, the first set of edges represents online searches performed between the entities, and the second set of edges represents a correlation of equity returns between the entities, wherein an edge connecting one entity and another entity in the first set of edges, represents a number of instances of directional searches performed on said one entity and said another entity immediately within a specified time period, wherein in training the GCN, the device is further caused to capture interaction of climate variables and equity prices and transmission of climate risk to equity returns, the climate variables including variables corresponding to acute climate hazards and chronic climate hazards, and to input the captured interaction of the climate variables and the equity prices and transmission of the climate risk to equity returns as values of the GCN's node feature corresponding to the climate change impact indicator;

receive, via a user interface, a selection of the given entity whose risk due to climate is to be predicted;

in response to receiving the selection, run the trained GCN to predict the risk for the given entity based on the climate risk of the entities in the trained GCN; and display the predicted risk for the given entity on the user interface.

* * * * *